US007317544B2

(12) United States Patent
Yamada

(10) Patent No.: US 7,317,544 B2
(45) Date of Patent: Jan. 8, 2008

(54) IMAGE PROCESSING APPARATUS OUTPUTTING A TIMING SIGNAL, AND CONTROLLING METHOD FOR THE SAME

(75) Inventor: Kazuro Yamada, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 891 days.

(21) Appl. No.: 10/015,747

(22) Filed: Dec. 17, 2001

(65) Prior Publication Data

US 2002/0085220 A1 Jul. 4, 2002

(30) Foreign Application Priority Data

Dec. 28, 2000 (JP) ............................ 2000/402709

(51) Int. Cl.
*G06F 3/12* (2006.01)
*H04N 1/03* (2006.01)
*H04N 1/48* (2006.01)

(52) U.S. Cl. ...................... 358/1.13; 358/1.6; 358/1.9; 358/2.1

(58) Field of Classification Search ................. 358/1.9, 358/2.1, 1.13; 399/50, 46, 66, 76, 78, 222, 399/223, 297, 298, 299; 347/4, 10, 11, 105, 347/16, 116, 172, 173, 185, 215
See application file for complete search history.

(56) References Cited

U.S. PATENT DOCUMENTS 6,040,924 A * 3/2000 Tamagaki et al. ........... 358/523
6,111,664 A 8/2000 Aoki et al. ................. 358/448
6,192,207 B1 * 2/2001 Yamamoto et al. ........... 399/82
6,252,618 B1 * 6/2001 Coriale et al. ............. 347/116

FOREIGN PATENT DOCUMENTS

JP 01146747 A * 6/1989
JP 02231344 A * 9/1990

* cited by examiner

*Primary Examiner*—Twyler Lamb
*Assistant Examiner*—Myles D. Robinson
(74) *Attorney, Agent, or Firm*—Fitzpatrick, Cella, Harper & Scinto

(57) ABSTRACT

When continuous printing in which color print and monochromatic print are mixedly present is to be effected, the distance between recording sheets is greatly widened to avoid problems when changeover takes place from monochromatic print to color print and therefore, the printing capability (the number of prints per unit time) is reduced.

When in an image processing apparatus for forming a color or monochromatic image on a recording sheet conveyed, by yellow, magenta, cyan and black image forming means, a plurality of recording mediums are continuously conveyed and a monochromatic image is to be formed on a preceding recording medium and a color image is to be formed on a succeeding recording medium, a timing signal A corresponding to the succeeding recording medium is outputted earlier than a timing signal B indicative of the start of image formation corresponding to the preceding recording medium.

7 Claims, 10 Drawing Sheets

IMAGE PROCESSING APPARATUS OUTPUTTING A TIMING SIGNAL, AND CONTROLLING METHOD FOR THE SAME

BACKGROUND OF THE INVENTION

1. Field of the Invention

This invention relates to an image processing apparatus and a controlling method therefor, and for example, to an image processing apparatus for forming an image by the electrophotographic process and a controlling method therefor.

2. Description of the Related Art

FIGS. 1 and 2 of the accompanying drawings are typical views showing the printing by a color image processing apparatus for successively transferring yellow, magenta, cyan and black colors to a recording material conveyed by a conveying belt.

When recording sheets long in a conveying direction are to be printed in the order of monochrome and full color, image formation in respective stations for yellow, magenta and cyan is not effected on the preceding recording sheet (shown as the first page in FIG. 1) to be monochromatically printed. At timing whereat the leading end of the recording sheet has arrived at a position corresponding to the exposure starting position of a black photosensitive drum, a vertical synchronization signal (hereinafter expressed as the "TOP signal") indicative of the output timing of black image data is outputted to a controller, not shown.

Next, a timing whereat the leading end of the succeeding recording sheet (shown as the second page in FIG. 1) to be color-printed has arrived at a position corresponding to the exposure starting position of a yellow photosensitive drum, a TOP signal indicative of the output timing of yellow image data is outputted to the controller.

However, in the image processing apparatus shown in FIGS. 1 and 2, in order to decrease the number of signal lines, the TOP signals uses a single signal line (a single signal) irrespective of the monochromatic print and the full color print.

FIG. 2 shows a state in which in the image processing apparatus of the same construction as that shown in FIG. 1, recording sheets short in the conveying direction are printed in the order of monochromatic color and full color.

When as shown in FIG. 2, the distance between the position of the yellow photosensitive drum and the position of the black photosensitive drum is defined as L1 and the length of the recording sheet in the conveying direction is defined as L2 and the distance between that recording sheet and the succeeding recording sheet is defined as L3, when the relation among them is L1>L2+L3, the image formation of (the first color yellow in) the succeeding full color print precedes the preceding monochromatic print. So, the sheet interval L3 is widened so that the order of image processing may not be reversed.

FIG. 3 of the accompanying drawings is a timing chart in continuous printing wherein full color and monochrome are mixedly present, and shows an example in which printing is effected in the order of monochrome, monochrome, full color, monochrome, full color and full color.

The TOP signal is used in both of full color print and monochromatic print, and what are designated by the reference numeral 301 in FIG. 3 are the TOP signals for full color print, and what are denoted by the reference numeral 401 are the TOP signals for monochromatic print.

A controller, in monochromatic print, outputs black image data 403 in synchronism with the TOP signals 401, and in full color print, outputs first color, i.e., yellow image data 303 in synchronism with the TOP signals 301, and thereafter outputs magenta, cyan and black image data (designated by the reference numerals 305, 307 and 309, respectively, in FIG. 3). Times denoted by T1, T2 and T3 in FIG. 3 correspond to the times for which a recording sheet is conveyed over distances from the yellow photosensitive drum to the other color photosensitive drums.

The number of printed sheets per unit time, i.e., the printing capability, in such a construction can be judged from the output timing of the black image data in both of full color and monochrome, as shown in FIG. 3.

When continuous print in which full color print and monochromatic print are mixedly present is to be effected, as is apparent from FIG. 3, the sheet interval L3 is greatly widened to avoid the above-noted problem when changeover takes place from monochromatic print to full color print, whereby the printing capability is reduced.

SUMMARY OF THE INVENTION

It is an object of the present invention to solve the above-noted problem and to prevent any reduction in the image forming capability when continuous image formation in which monochromatic and color images are mixedly present is effected.

It is another object of the present invention to provide an image processing apparatus for forming a visible image on a recording medium conveyed by conveying means, by a plurality of color component image forming means corresponding to a plurality of color components including at least black respectively, having:

signal outputting means for outputting a timing signal for instructing to start the formation of a first color component image differing depending on image forming modes;

wherein when a monochromatic image is to be formed on a preceding recording medium and a color image is to be formed on a succeeding recording medium, the signal outputting means outputs the timing signal corresponding to the succeeding recording medium earlier than the timing signal corresponding to the preceding recording medium.

It is still another object of the present invention to provide a controlling method for an image processing apparatus for forming a visible image on a recording medium conveyed by conveying means, by a plurality of color component image forming means corresponding to a plurality of color components including at least black respectively, having:

the step of outputting a timing signal for instructing the recording medium conveyed by the conveying means to start the formation of a first color component image differing depending on image forming mode;

wherein when a monochromatic image is to be formed on a preceding recording medium and a color image is to be formed on a succeeding recording medium, the step outputs the timing signal corresponding to the succeeding recording medium earlier than the timing signal corresponding to the preceding recording medium.

Other objects, constructions and effects of the present invention will become apparent from the following detailed description and the accompanying drawings.

DESCRIPTION OF THE PREFERRED EMBODIMENTS

Image processing apparatuses according to some embodiments of the present invention will hereinafter be described in detail with reference to the drawings.

First Embodiment

A color image processing apparatus according to a first embodiment is of a construction in which color images formed on an intermediate transfer belt are transferred to a recording sheet, and prevents any reduction in printing capability in continuous printing in which monochromatic print and full color print are mixedly present.

Construction

Figure 4:
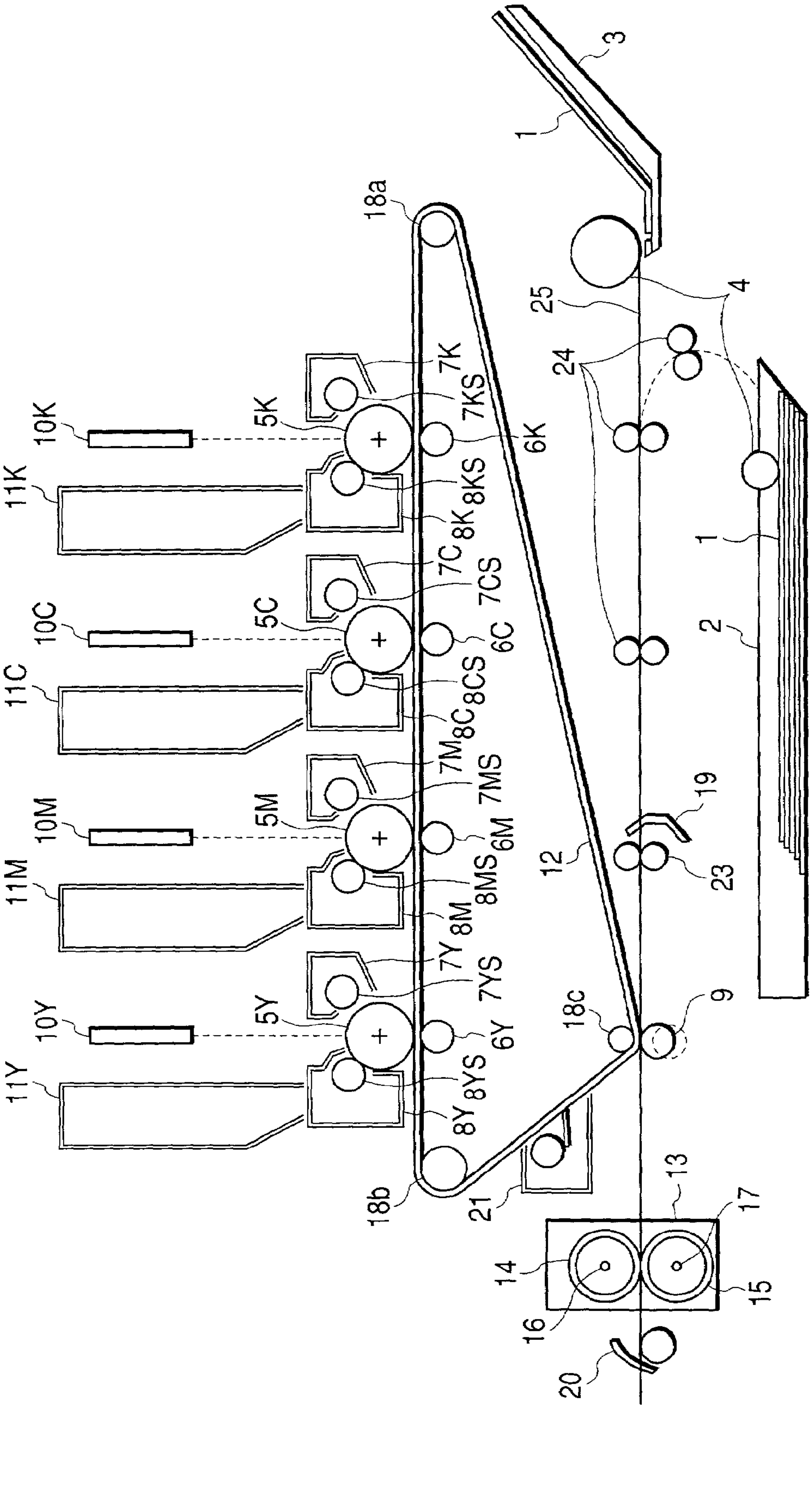
FIG. 4 shows the general construction of a color image processing apparatus according to a first embodiment.

FIG. 4 shows the general construction of the color image processing apparatus.

The color image processing apparatus shown in FIG. 4 forms, for each color, an electrostatic latent image on a photosensitive drum by exposure based on image data in an image forming portion, develops this electrostatic latent image into a visible image, transfers the visible image to a transfer belt 12 and forms a color image, and thereafter transfers the color image to a recording sheet and fix it.

The color image forming portion is provided with photosensitive drums 5Y, 5M, 5C and 5K, chargers 7Y, 7M, 7C and 7K, laser scanners 10Y, 10M, 10C and 10K, developing devices 8Y, 8M, 8C and 8K, toner cartridges 11Y, 11M, 11C and 11K, and primary transfer rollers 6Y, 6M, 6C and 6K in respective ones of stations juxtaposed by the number of developing colors. The color image forming portion is further provided with an intermediate transfer belt 12, a secondary transfer roller 9, a sheet feeding and conveying portion and a fixing device 13.

Each photosensitive drum is of a construction in which an organic photoconductive layer is formed on the outer periphery of an aluminum cylinder, and is counter-clockwisely rotated by a driving motor, not shown. The photosensitive drum is primary-charged by the charger provided with a charging sleeve 7YS, 7MS, 7CS or 7KS. The surface of the photosensitive drum is exposed to a laser beam on the basis of inputted image data, whereby an electrostatic latent image is formed thereon. The electrostatic latent image is developed into a visible image by the developing device provided with a developing sleeve 8YS, 8MS, 8CS or 8KS.

The intermediate transfer belt 12 is an endless belt passed over a drive roller 18*a* and driven rollers 18*b* and 18*c*, and is in contact with the respective photosensitive drums and is clockwisely rotated. The toner images on the photosensitive drums are transferred to the surface of the belt by the primary transfer rollers.

Recording sheets 1 contained in the sheet feed cassette 2 of a sheet feeding portion or recording sheets 1 placed on a sheet feed tray 3 are conveyed one by one on a conveying path 25 by a feed roller 4 and conveying rollers 24, and arrive at the position of an ante-registration sensor 19. The recording sheet 1 is further conveyed by a predetermined distance and arrives at registration rollers 23, and is made to wait while forming a loop.

The recording sheet 1 liberated from waiting is conveyed to the portion of contact between the intermediate transfer belt 12 and the secondary transfer roller 9 and is nipped and conveyed between the intermediate transfer belt 12 and the secondary transfer roller 9, whereby visible color images superimposed and transferred onto the intermediate transfer belt 12 are collectively secondary-transferred to the recording sheet 1. During transfer, the secondary transfer roller 9 is in contact with the intermediate transfer belt 12 as indicated by solid line, but during the other time, it is spaced apart to a position indicated by dotted line. Any residual toners remaining on the intermediate transfer belt 12 are removed by a cleaning blade contained in a cleaner container 21, and are stored as waste toners in the cleaner container 21.

The fixing device 13 fixed the toner images on the recording sheet 1 while conveying the recording sheet 1. The fixing device 13 is provided with a fixing roller 14 for heating the toners, and a pressure roller 15 for bringing the recording sheet 1 into pressure contact with the fixing roller 14. The fixing roller 14 and the pressure roller 15 are formed into a hollow shape and contain a heater 16 or 17 therein.

The recording sheet 1 having the toners fixed thereon has its normal discharge from the fixing device 13 detected by a fixing discharge sensor 20, and is discharged to a sheet discharge portion, not shown, by discharge rollers, not shown, thus completing the image forming operation.

Figure 5:
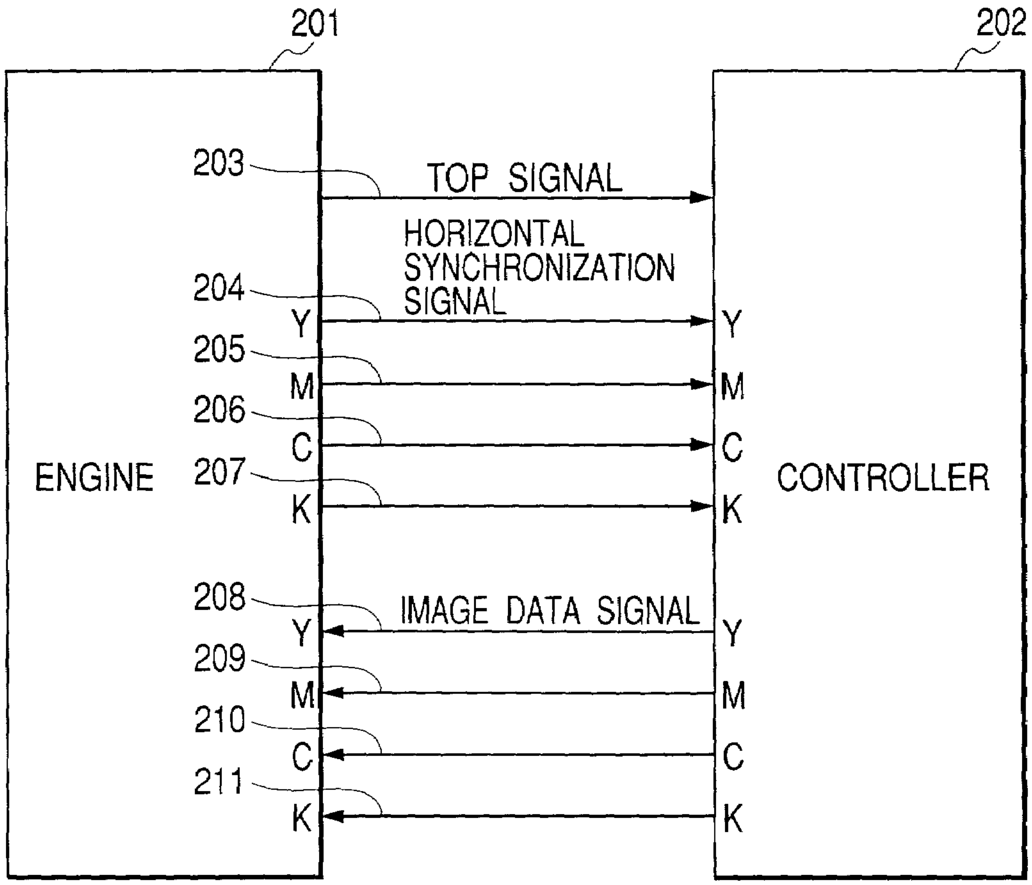
FIG. 5 illustrates the interface signals of the engine and controller of the color image processing apparatus.

FIG. 5 illustrates the interface signals of the engine and controller of the color image processing apparatus.

A TOP signal (vertical synchronization signal) 203 and horizontal synchronization signals 204 to 207 of respective colors are sent from the engine 201 to the controller 202. Image data 208 to 211 of respective colors synchronized with the horizontal synchronization signals 204 to 207 of respective colors are sent from the controller 202 to the engine 201.

Print Timing

Figure 6:
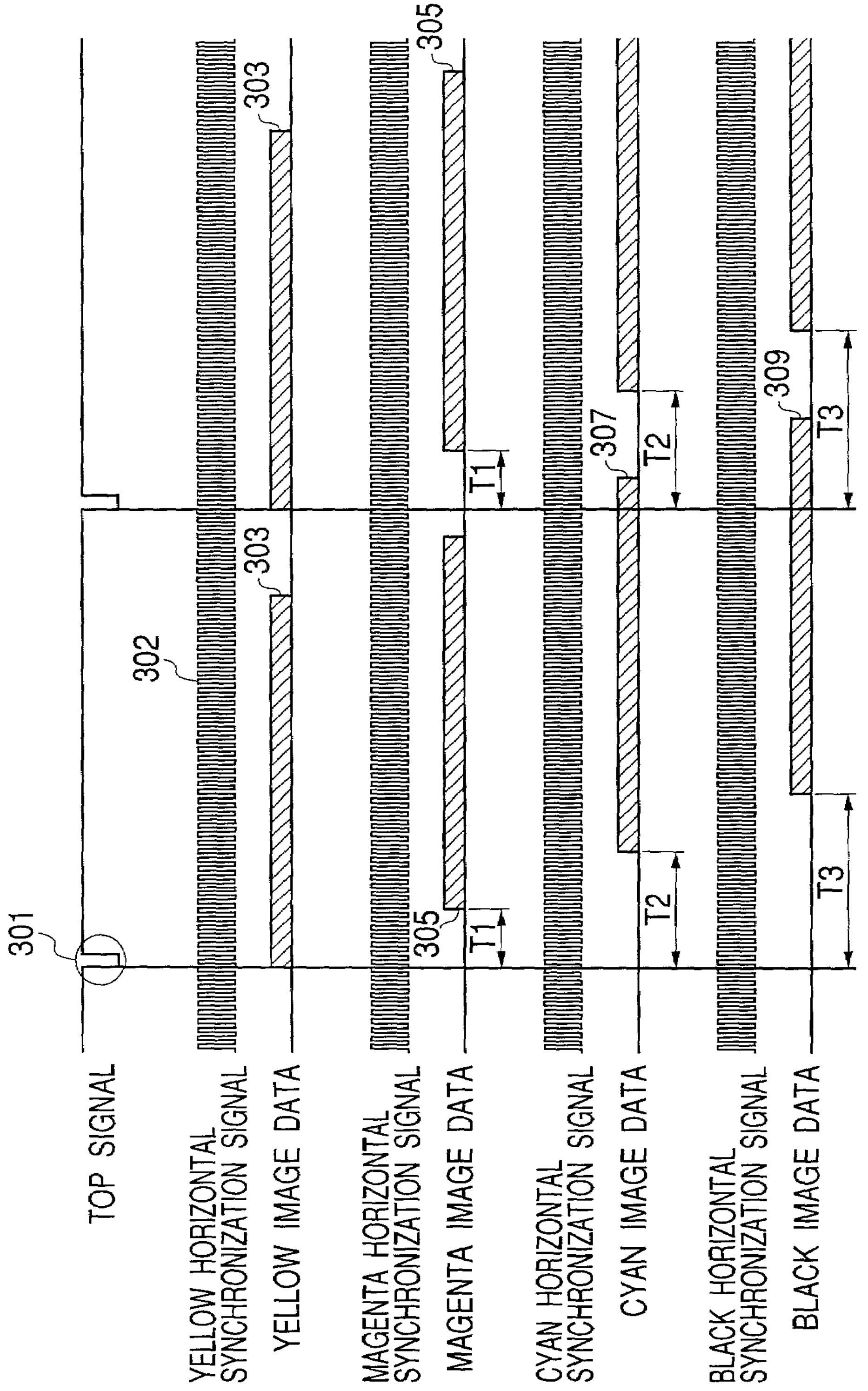
FIG. 6 is a timing chart showing a TOP signal and horizontal synchronization signals and image data of respective colors when full color print is effected.

FIG. 6 is a timing chart showing the TOP signal and the horizontal synchronization signals and image data of respective colors when full color print is effected.

The controller 202 causes the engine 201 to start the printing operation when it is instructed to start full color print by a host computer or the like, not shown. When it starts the printing operation, the engine 201 drives the photosensitive drums 5Y, 5M, 5C and 5K, the intermediate transfer belt 12 and the laser scanners 10Y, 10M, 10C and 10K and makes preparations for forming images of respective colors. At a point of time whereat the preparations have been made, the engine 201 outputs to the controller 202 the TOP signal 301 for taking vertical synchronization for the first color.

The controller 202 outputs yellow image data 303 synchronized with the TOP signal 301 and the yellow horizontal synchronization signal 302 inputted from the engine 201. The engine 201 primary-transfers a yellow toner image onto the intermediate transfer belt 12 by the above-described procedure on the basis of the yellow image data 303 inputted thereto. The controller 202 outputs magenta image data 305 after the lapse of a time T1 shown in FIG. 6 in order to fit to the timing at which the yellow toner image on the intermediate transfer belt 12 arrives at the primary transfer position of a magenta toner image. The controller 202, likewise for cyan and black, outputs cyan image data 307 and black image data 309 after the lapse of a time T2 and after the lapse of a time T3, respectively.

Figure 7:
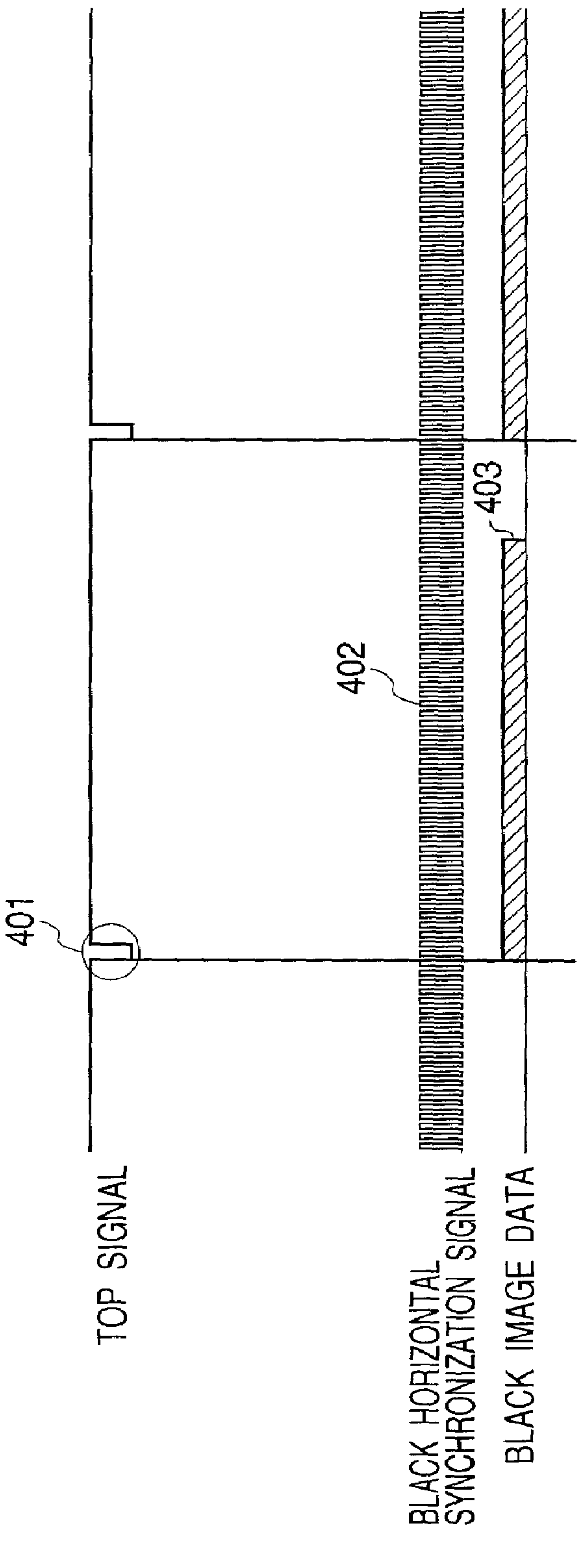
FIG. 7 is a timing chart showing a TOP signal and a black horizontal synchronization signal and image data when monochromatic print is effected.

FIG. 7 is a timing chart showing the TOP signal and the black horizontal synchronization signal and image data when monochromatic print is effected.

The controller 202 causes the engine 201 to start the printing operation when it is instructed to start monochromatic print by the host computer or the like, not shown. When it starts the printing operation, the engine 201 drives at least the photosensitive drum 5K, the intermediate transfer belt 12 and the laser scanner 10K to thereby make preparations for monochromatic image formation. At a point of time whereat the preparations have been made, the engine 201 outputs to the controller 202 a TOP signal 401 for taking black vertical synchronization.

The controller 202 outputs black image data 403 synchronized with the TOP signal 401 and a horizontal synchronization signal 402 inputted from the engine 201. The engine 201 primary-transfers the black toner image onto the intermediate transfer belt 12 by the above-described procedure on the basis of the black image data 403.

Print Timing When Full Color and Monochrome are Mixedly Present

Figure 1:
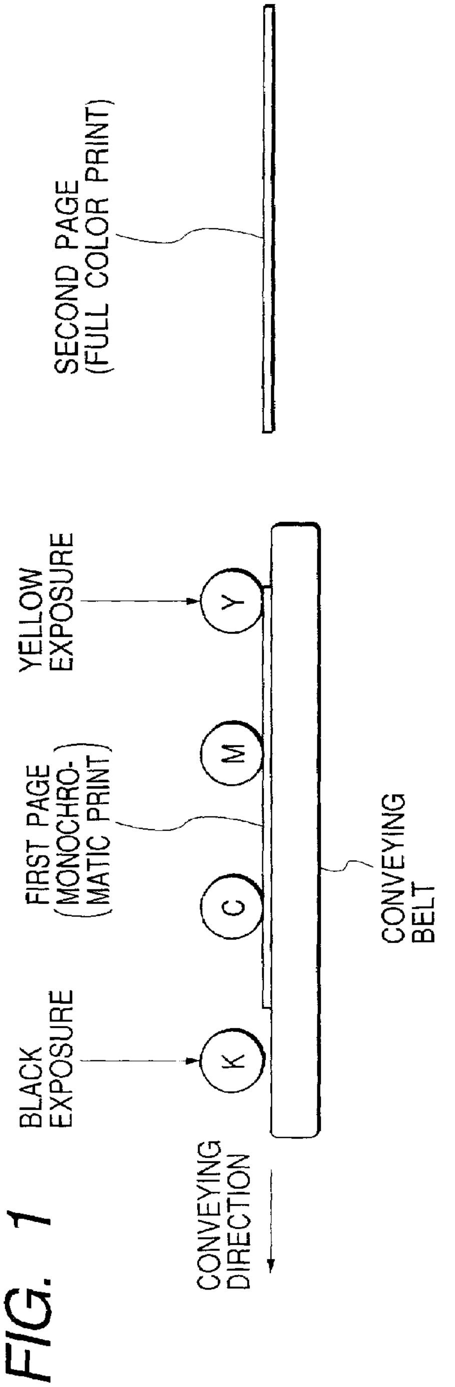
FIG. 1 is a typical view showing the printing by a color image processing apparatus for successively transferring yellow, magenta, cyan and black to a recording sheet conveyed by a conveying belt.
Figure 2:
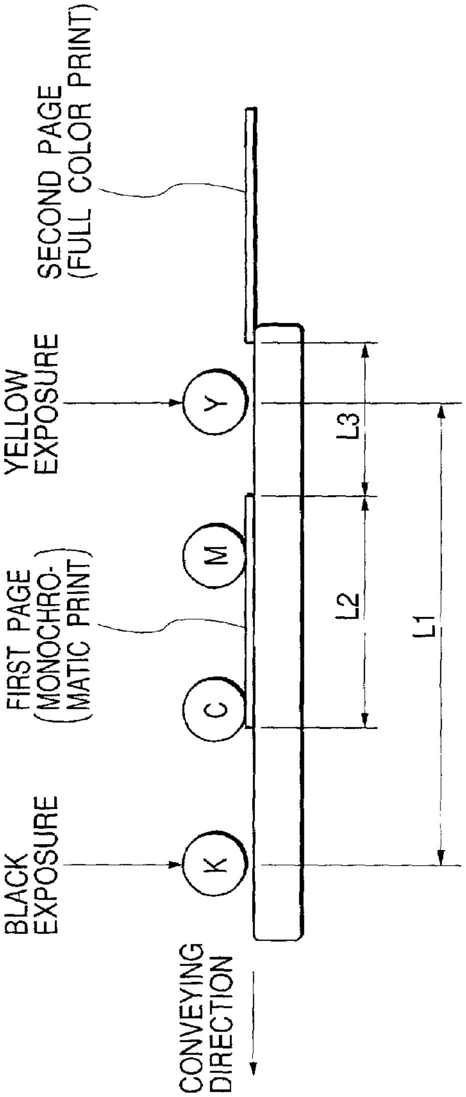
FIG. 2 is a typical view showing the printing by a color image processing apparatus for successively transferring yellow, magenta, cyan and black to a recording sheet conveyed by a conveying belt (particularly showing a state in which recording sheets short in a conveying direction are printed in the order of monochrome and full color.
Figure 3:
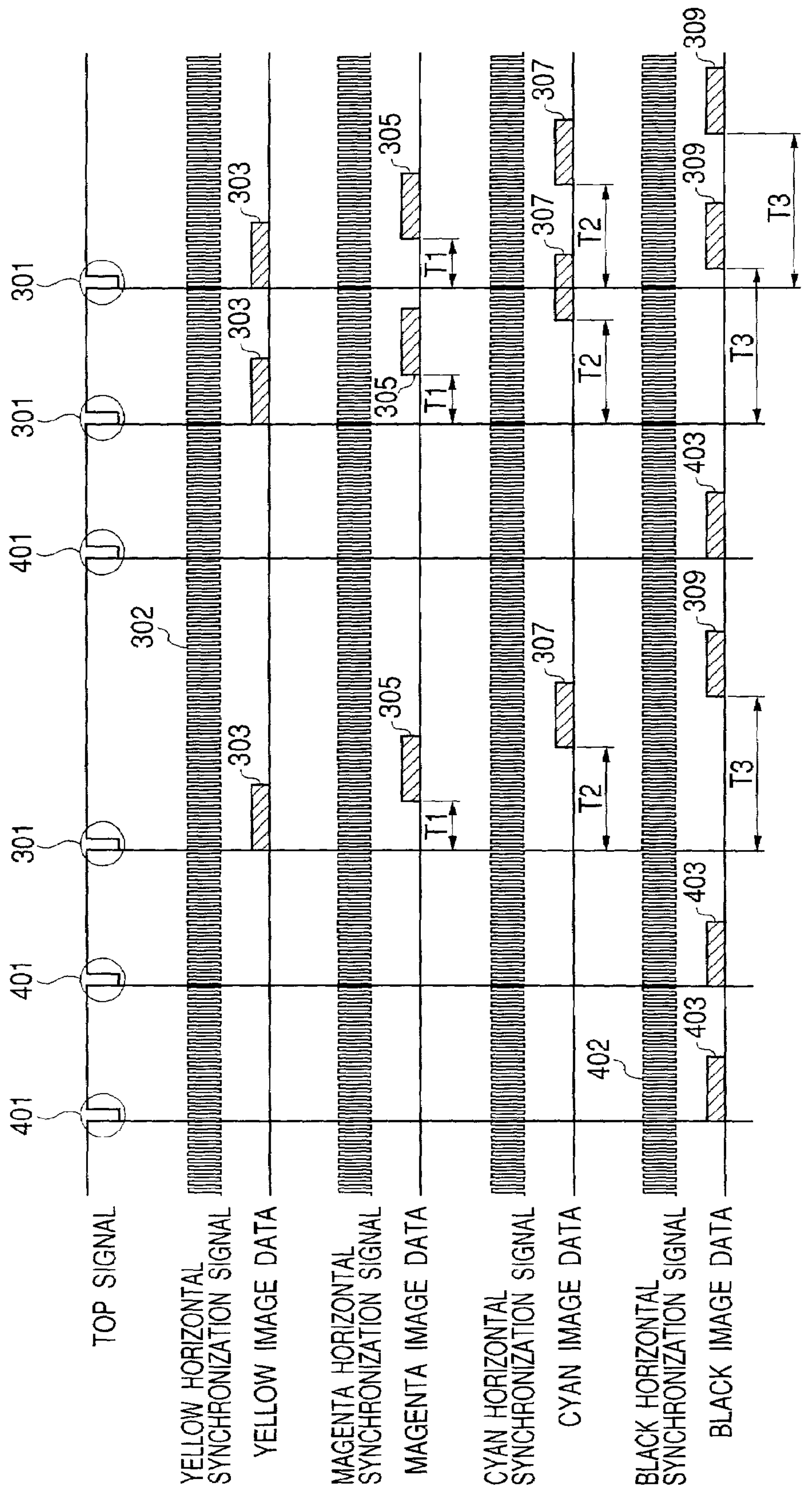
FIG. 3 is a timing chart in continuous printing in which full color and monochrome are mixedly present.
Figure 8:
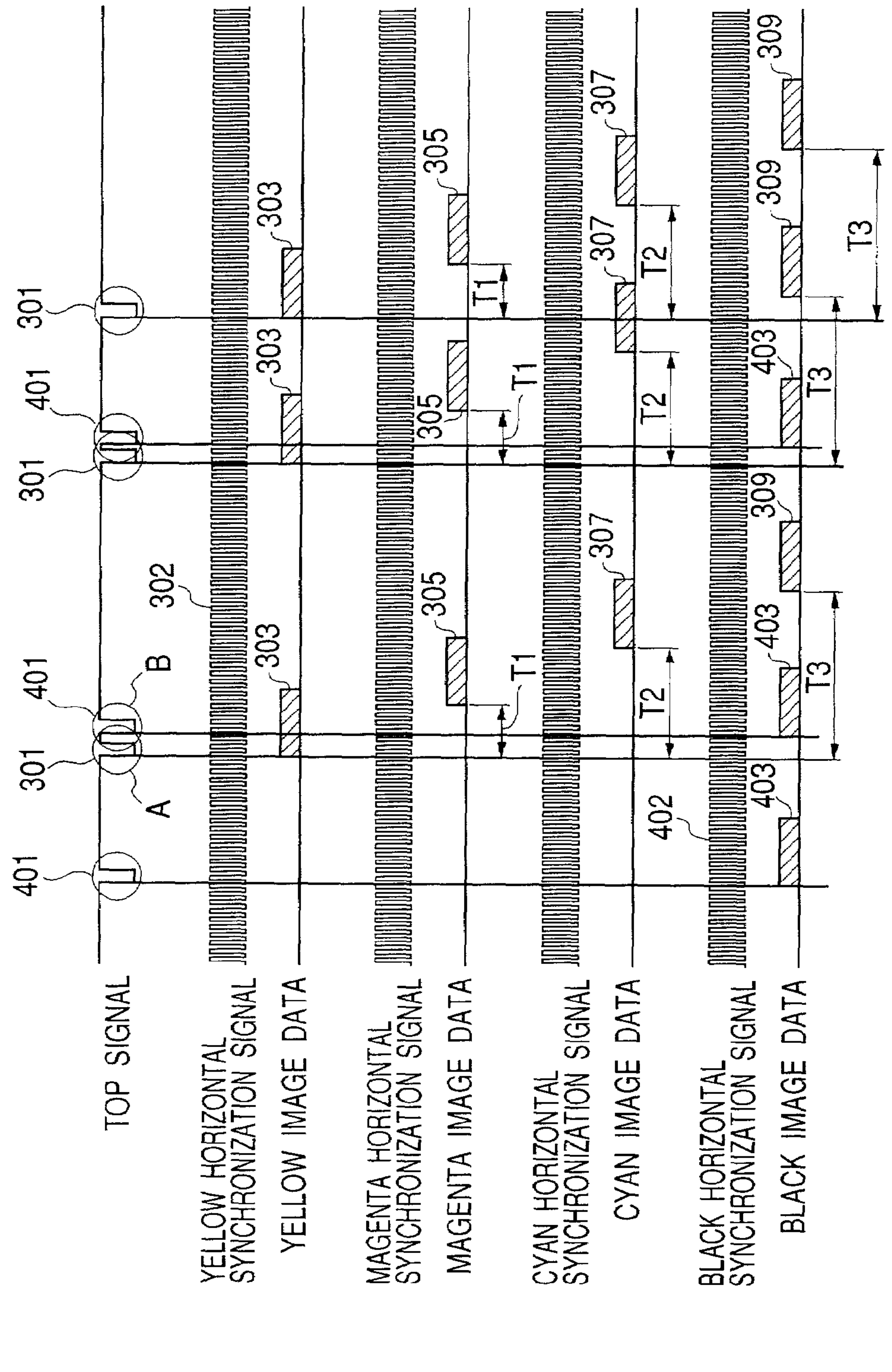
FIG. 8 is a timing chart in continuous printing in which full color and monochrome are mixedly present.

FIG. 8 is a timing chart in continuous printing in which full color and monochrome are mixedly present, and like FIG. 3, it shows an example in which printing is effected in the order of monochrome, monochrome, full color, monochrome, full color and full color.

The engine 201 outputs the TOP signals 301 and 401 so that the controller 202 which can know the order of print modes in advance can output black image data common to full color print and monochromatic print at predetermined intervals.

In the timing chart shown in FIG. 8, as compared with the timing chart shown in FIG. 3, the order of the TOP signal of the second page (monochromatic print) and the TOP signal of the third page (full color print) changes places. Likewise, the order of the TOP signal of the fourth page (monochromatic print) and the TOP signal of the fifth page (full color print) change places.

The controller 202 knows not only the order of the print modes, but also the length of the recording sheet in the conveying direction thereof. It can also known the distance between recording sheets which is a constant value set by the engine by the use of the serial communication line, not shown, between the engine 201 and the controller 202. Therefore, when the distance between the position of the yellow photosensitive drum and the position of the black photosensitive drum is defined as L1 and the length of the preceding recording sheet to be full-color-printed in the conveying direction is defined as L2 and the distance between the preceding recording sheet and the succeeding recording sheet to be monochromatically printed is defined as L3, the controller 202 can judge whether L1>L2+L3. Consequently, on the basis of the result of this judgment, the controller 202 can know whether the inputted TOP signal is a TOP signal corresponding to which recording sheet.

Also, when printing is to be effected in the order of full color, monochrome and monochrome, when the length of the recording sheet to be monochromatically printed (the second sheet) in the conveying direction is L4, even if the recording sheets are ones small in L2 and L4, L2+L3+L4+L3>L1 without fail and therefore, next to the TOP signal for monochromatic print (the second sheet), the TOP signal for full color print (the first sheet) comes.

That is, in continuous printing in which full color print and monochromatic print are mixedly present, the engine 201 outputs the TOP signal so that the controller 202 can output black image data at substantially constant intervals. Finally, printing is rightly effected in the designated order of print modes.

As described above, when in the image processing apparatus wherein the TOP signal is outputted only at the first color image formation starting timing in the print modes of full color print and monochromatic print, monochromatic print is to be effected on the preceding recording sheet and full color print is to be effected on the succeeding recording sheet, if the sum of the length of the preceding recording sheet in the conveying direction and the distance between the recording sheets is shorter than the distance from the station for the first color to the station for monochrome (black) in full color print, the TOP signal (A in FIG. 8) for the succeeding recording sheet is outputted earlier than the TOP signal (B in FIG. 8) for the preceding sheet and therefore, when continuous printing in which monochromatic print and full color print are mixedly present is to be effected, the distance between the recording sheets need not be widened and any reduction in the printing capability (the number of prints per unit time) during continuous printing can be prevented.

Second Embodiment

An image processing apparatus according to a second embodiment of the present invention will be described hereinafter. In the second embodiment, members similar to those in the first embodiment are given the same reference numerals and need not be described in detail.

The engine 201 of the image processing apparatus according to the second embodiment has the function of informing of the print mode for the outputted TOP signal at real time.

Figure 9:
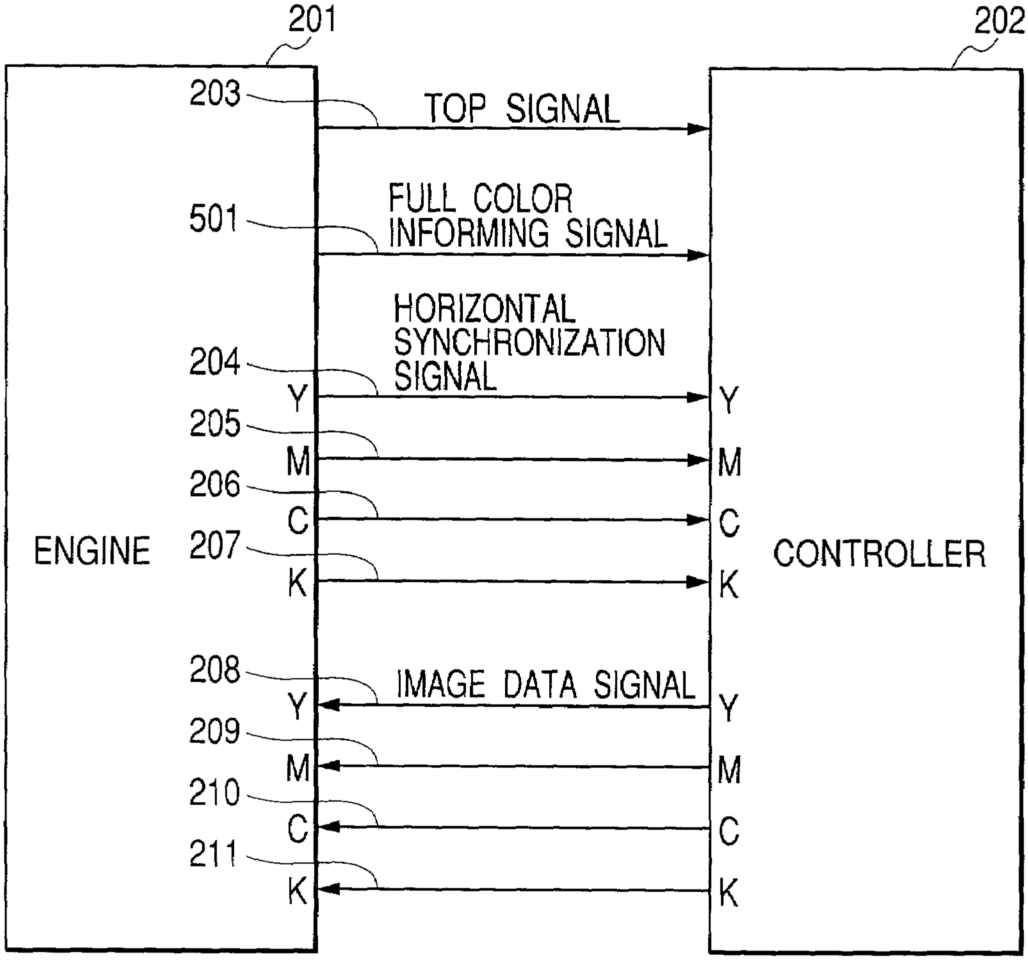
FIG. 9 illustrates the interface signals of the engine and controller of a color image processing apparatus according to a second embodiment.

FIG. 9 illustrates the interface signals of the engine and controller of the color image processing apparatus, and a signal line 501 is added to the interface in the first embodiment shown in FIG. 5 to thereby make the informing of the print mode possible. The signal line 501 is for a full color informing signal, and if it is a high level at the falling edge of a TOP signal, it indicates that the TOP signal requires color image data (specifically, yellow image data), and if it is a low level, it indicates that the TOP signal requires black image data.

Figure 10:
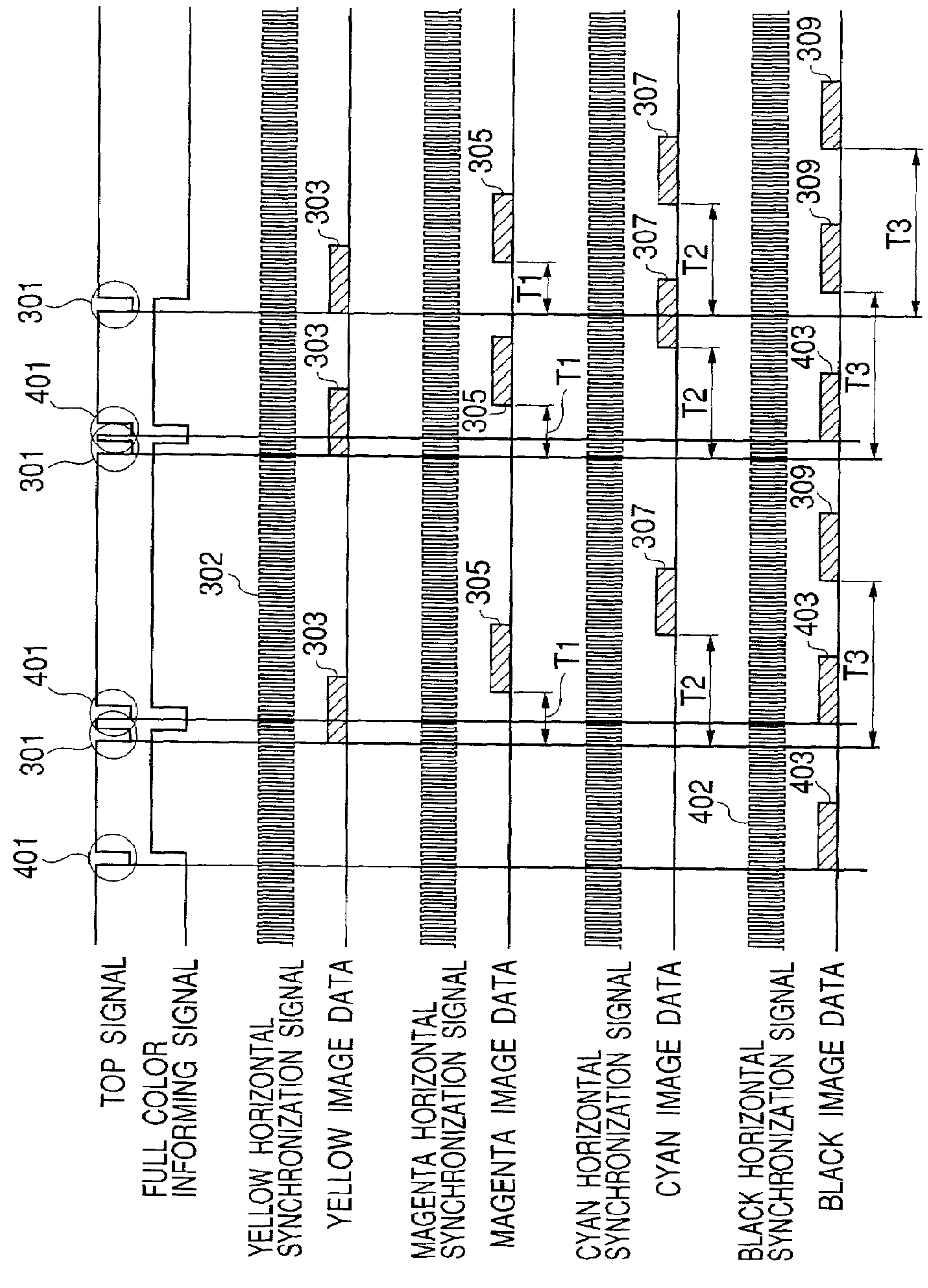
FIG. 10 is a timing chart in continuous printing in which full color and monochrome are mixedly present.

FIG. 10 is a timing chart in continuous printing in which full color and monochrome are mixedly present, and like FIG. 3, it shows an example in which printing is effected in the order of monochrome, monochrome, full color, monochrome, full color and full color.

By the use of a serial communication line, not shown, between the engine 201 and the controller 202, the controller 202 designates in advance to the engine 201 the print mode (the distinction between full color and monochrome) for each print page and the type (the length in the conveying direction) of the recording sheet, prior to the continuous printing operation. On the basis of this information, the engine 201 judges whether full color print or monochromatic print should be effected on individual recording sheets.

The engine 201 outputs a TOP signal 203 and informs of a print mode corresponding to the TOP signal by a full color informing signal 501 so that the controller 202 can output black image data common to full color print and monochromatic print at substantially constant intervals.

Instead of informing of the print mode by the full color informing signal 501, use can be made of the serial communication line, not shown, between the engine 201 and the controller 202, or the like. If this is done, the engine 201 can inform the controller 202 of the print mode before it outputs the TOP signal.

As described above, in continuous printing in which full color print and monochromatic print are mixedly present, the engine 201 outputs the TOP signal and also informs the controller 202 of the print mode corresponding to the TOP signal, whereby the controller 202 can make the output intervals of black image data substantially constant.

As described above, according to the present embodiment, any reduction in the image forming capability when effecting continuous image formation in which monochromatic and color images are mixedly present can be prevented.

Modification

Figure 11:
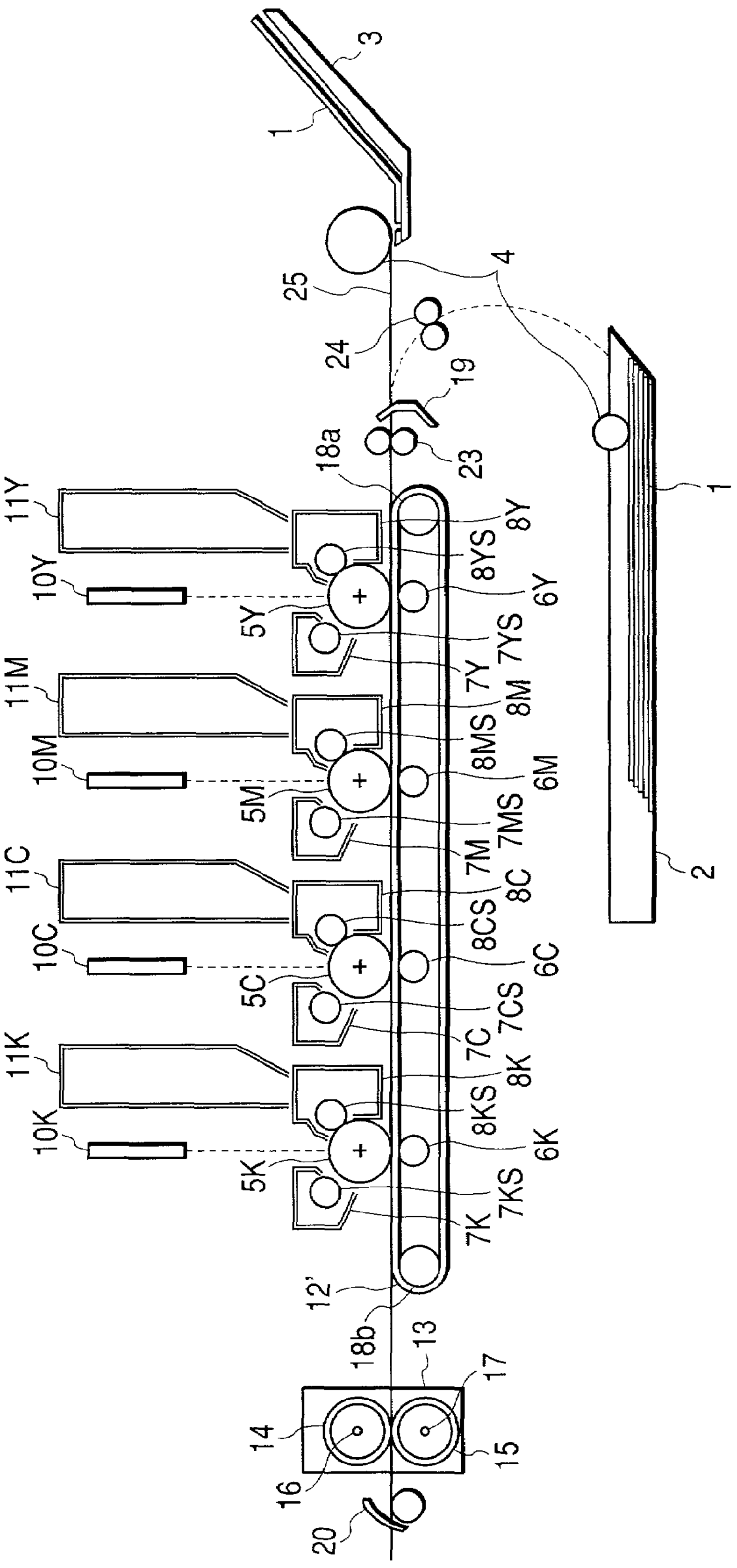
FIG. 11 shows the construction of an image processing apparatus of a type transferring toner images directly from photosensitive drums to a recording sheet without using an intermediate transfer belt.

While in each of the above-described embodiments, an image processing apparatus in which toner images of full color formed on an intermediate transfer belt are transferred to a recording sheet has been taken as an example, there is also an image processing apparatus of a type as shown in FIG. 11 wherein without the use of an intermediate transfer belt, toner images are directly transferred from photosensitive drums to a recording sheet.

If the output timing of the TOP signal and the full color informing signal described in the above-described embodiments are applied to the image processing apparatus shown in FIG. 11, as in the above-described embodiments, any reduction in the printing capability (the number of prints per unit time) can be prevented when effecting continuous printing in which monochromatic print and full color print are mixedly present.

Other Embodiments

The present invention may be applied to a system comprised of a plurality of apparatuses (for example, a host computer, an interface apparatus, a reader, a printer, etc.) or an apparatus comprising an instrument (such as a copier or a facsimile apparatus).

Also, the objects of the present invention is of course achieved by supplying a storing medium (or a recording medium) having recorded therein the program code of software for realizing the function of the aforedescribed embodiments to a system or an apparatus, and the computer (or the CPU or the MPU) of the system or the apparatus reading out and executing the program code stored in the storing medium. In this case, the program code itself read out of the storing medium realizes the function of the aforedescribed embodiments, and the storing medium storing the program code therein constitutes the present invention. Also, there is of course covered a case where by the program code read out by the computer being executed, not only the function of the aforedescribed embodiments is realized, but on the basis of the instructions of the program code, an operating system (OS) or the like working on the computer carries out some or all of actual processing, and the function of the aforedescribed embodiments is realized by the processing.

Further, there is of course covered a case where the program code read out of the storing medium is written into a memory provided in a function expanding card inserted into the computer or a function expanding unit connected to the computer, whereafter on the basis of the instructions of the program code, a CPU or the like provided in the function expanding card or the function expanding unit carries out some or all of actual processing, and the function of the aforedescribed embodiments is realized by the processing.

While the present invention has been described above with respect to some preferred embodiments, it is apparent that the present invention is not restricted to these embodiments, but various modifications and applications are possible within the scope of the invention as defined in the appended claims.

What is claimed is:

1. An image processing apparatus for forming a visible image on a recording medium conveyed by conveying means, based on an image data sent from an image formation controller, in a color image formation mode for forming a color image or a monochromatic image formation mode for forming a monochromatic image, said apparatus having:

a plurality of color component image forming units that form a color component image respectively corresponding to a color component including at least black;

a timing signal outputting part that outputs via a common signal line to said image formation controller, a timing signal for instructing a formation of a first color component image in said color image formation mode or a formation of a black component image in said monochromatic image formation mode, wherein, when a monochromatic image is to be formed on a preceding recording medium and a color image is to be formed on a succeeding recording medium, said timing signal outputting part outputs the timing signal corresponding to the succeeding recording medium earlier than the timing signal corresponding to the preceding recording medium.

2. An image processing apparatus according to claim 1, wherein said timing signal outputting part output said timing signal when a recording medium conveyed by the conveying means reaches a predetermined position differing in each of said image forming modes.

3. An image processing apparatus according to claim 2, wherein said signal outputting part precedently output said timing signal corresponding to the succeeding recording medium when a sum of a length of the preceding recording medium in a conveying direction thereof and a distance between the preceding recording medium and the succeeding recording medium is short relative to a distance from said color component image forming unit corresponding to said first color when the color image is formed to said color component image forming unit for forming the monochromatic image.

4. An image processing apparatus according to claim 2, wherein said conveying means, when it continuously conveys a plurality of recording mediums, controls a distance between the recording mediums so as to be constant irrespective of lengths of a conveyed recording mediums in the conveying direction thereof.

5. An image processing apparatus according to claim 1, further having a mode signal outputting part that outputs a mode signal indicative of an image forming mode corresponding to said timing signal.

6. An image processing apparatus according to claim 1, further having an image data receiving part that receives, in synchronism with said timing signal, image data corresponding to respective ones of said color component image forming means in a predetermined order in said color image formation mode, or image data corresponding to said black component image forming unit in said monochromatic image formation mode.

7. A controlling method for an image processing apparatus for forming a visible image on a recording medium conveyed by conveying means, based on an image data sent from an image formation controller, in a color image formation mode for forming a color image or a monochromatic image formation mode for forming a monochromatic image, said apparatus having a plurality of color component image forming units that form a color component image respectively corresponding to a color component including at least black, said method, having a step of outputting, via a common signal line, a timing signal for instructing a formation of a first color component image in said color image formation mode or a formation of a black component image in said monochromatic image formation mode;

wherein, when a monochromatic image is to be formed on a preceding recording medium and a color image is to be formed on a succeeding recording medium, said step outputs said timing signal corresponding to said succeeding recording medium earlier than said timing signal corresponding to said preceding recording medium.

* * * * *

UNITED STATES PATENT AND TRADEMARK OFFICE

CERTIFICATE OF CORRECTION

PATENT NO. : 7,317,544 B2
APPLICATION NO. : 10/015747
DATED : January 8, 2008
INVENTOR(S) : Yamada It is certified that error appears in the above-identified patent and that said Letters Patent is hereby corrected as shown below:

COVER SHEET:

(30) Foreign Application Priority Data, "Dec. 28, 2000 (JP) 2000/402709" should read -- Dec. 28, 2000 (JP) 2000-402709 --.

(56) FOREIGN PATENT DOCUMENTS:

"JP 01146747 A * 6/1989" should read -- JP 1-146747 A * 6/1989 --; and
"JP 02231344 A * 9/1990" should read -- JP 2-231344 A * 9/1990 --.

COLUMN 1:

Line 38, "signals uses" should read -- signals use --.

COLUMN 3:

Line 4, "(particularly" should read -- particularly --; and
Line 57, "fix it." should read -- fixes it. --.

COLUMN 4:

Line 41, "fixed" should read -- fixes --.

COLUMN 6:

Line 1, "known" should read -- know --.

COLUMN 8:

Line 1, "is of" should read -- are of --;
Line 12, "where by" should read -- whereby --;
Line 59, "output" should read -- outputs --; and
Line 64, "output" should read -- outputs --.

UNITED STATES PATENT AND TRADEMARK OFFICE

CERTIFICATE OF CORRECTION

PATENT NO. : 7,317,544 B2
APPLICATION NO. : 10/015747
DATED : January 8, 2008
INVENTOR(S) : Yamada It is certified that error appears in the above-identified patent and that said Letters Patent is hereby corrected as shown below:

COLUMN 9:

Line 11, "a conveyed" should read -- conveyed --.

Signed and Sealed this

Twenty-sixth Day of August, 2008

JON W. DUDAS
*Director of the United States Patent and Trademark Office*